(12) United States Patent
Bosman et al.

(10) Patent No.: US 7,842,207 B2
(45) Date of Patent: Nov. 30, 2010

(54) PANEL-LIKE LAMINATE AND A SKIN FOR MANUFACTURING SUCH LAMINATE

(75) Inventors: Nele Bosman, Wetteren (BE); Kristiaan Bracke, Wetteren (BE); Bart Broeckaert, Wetteren (BE); Hugo De Winter, Wetteren (BE); Jan Willems, Wetteren (BE)

(73) Assignee: Recticel NV, Brussels (Evere) (BE)

( * ) Notice: Subject to any disclaimer, the term of this patent is extended or adjusted under 35 U.S.C. 154(b) by 212 days.

(21) Appl. No.: 12/064,335

(22) PCT Filed: Aug. 22, 2006

(86) PCT No.: PCT/EP2006/065544

§ 371 (c)(1),
(2), (4) Date: Mar. 24, 2008

(87) PCT Pub. No.: WO2007/023157

PCT Pub. Date: Mar. 1, 2007

(65) Prior Publication Data

US 2008/0229697 A1 Sep. 25, 2008

(30) Foreign Application Priority Data

Aug. 23, 2005 (EP) ................... 05107731

(51) Int. Cl.
*B29C 65/00* (2006.01)
*E04C 2/38* (2006.01)
*B32B 5/20* (2006.01)

(52) U.S. Cl. .................. 264/46.5; 52/716.3; 428/318.8; 428/259

(58) Field of Classification Search .................. 156/71; 264/139, 261, 41; 296/1.08, 146.7, 39.1, 296/70; 428/157, 192, 60; 52/208, 474, 52/588.1, 716.1, 716.2, 716.3, 716.4, 716.5, 52/716.6, 717.03, 792.1, 794.1, 800.11
See application file for complete search history.

(56) References Cited

U.S. PATENT DOCUMENTS 4,744,185 A * 5/1988 Lamberet et al. ......... 52/309.11

(Continued)

FOREIGN PATENT DOCUMENTS

EP 552 391 A1 7/1993

(Continued)

*Primary Examiner*—David Dunn
*Assistant Examiner*—Benjamin Pevarski
(74) *Attorney, Agent, or Firm*—Sughrue Mion, PLLC

(57) ABSTRACT

The panel-like laminate comprises a flexible skin (1), a rigid substrate (2) and an intermediate layer (3). The flexible skin (1) comprises a main part (8) which forms the front side of the laminate and at least one flange (9) which extends from the main part (8) of the skin towards the substrate (2) to form at least a portion of the lateral side of the laminate. In order to avoid foam leakage when molding the intermediate layer (3) between the skin (1) and the substrate (2), the flange (9) is extended by a border part (10) which comprises a flexible lip (11). The flexible lip is pressed against the rigid substrate (2) so that the flexible lip (11) forms a seal between the skin and the substrate. To prevent deformation of the skin, the border part (10) of the skin further comprises at least one continuous or discontinuous ridge (12) which extends along the flange (9) of the skin (1) and which prevents a sliding of this border part when closing the mold.

29 Claims, 4 Drawing Sheets

U.S. PATENT DOCUMENTS

| | | | | |
|---|---|---|---|---|
| 5,281,383 A | * | 1/1994 | Ueki et al. | 264/259 |
| 6,004,498 A | * | 12/1999 | Fujii et al. | 264/255 |
| 6,740,390 B2 | * | 5/2004 | Randazzo | 428/122 |
| 2003/0170404 A1 | | 9/2003 | Piec et al. | |
| 2003/0180498 A1 | * | 9/2003 | De Winter et al. | 428/67 |

FOREIGN PATENT DOCUMENTS

| | | | |
|---|---|---|---|
| JP | 2000246742 A | * | 9/2000 |
| WO | WO 03/078128 A1 | | 9/2003 |

* cited by examiner

PANEL-LIKE LAMINATE AND A SKIN FOR MANUFACTURING SUCH LAMINATE

The present invention relates to a panel-like laminate which has a front side, a back side and at least one lateral side and which comprises a rigid substrate forming the back side of the laminate, a flexible skin having a front and a back side and an intermediate layer adhering the back side of the skin to the substrate, the flexible skin comprising a main part forming the front side of the laminate and at least one flange extending from said main part towards the substrate to form at least a portion of the lateral side of the laminate, the flange being extended by a border part of the skin which comprises a flexible lip having a top which is pressed against the rigid substrate so that the flexible lip is bent.

The panel-like laminate is in particular a trim part, more particularly an interior trim part for an automotive vehicle. Such trim parts are usually manufactured by positioning the skin on a first mould section and the rigid substrate on a second mould section of the backfoam mould and by allowing a foamable composition to foam in the closed position of the backfoam mould between the skin and the rigid substrate. A problem of such a manufacturing method is that thickness variations of the skin and/or of the rigid substrate, or an incorrect positioning of the skin and/or of the substrate, frequently leads to gaps between the skin and the substrate through which the foamable composition can escape. Foam leakage may occur at the backside surfaces of the substrate, at the visual side of the skin layer and against the mould cavity wall. The resulting foam flashes need to be removed before the backfoamed panel can be further processed, which means an extra labour cost. Also the mould needs to be treated with a release agent to prevent sticking of the foam to the mould and has to be cleaned before performing the next backfoaming process.

WO 03/078128 discloses a direct backfoaming process wherein a flexible polyurethane skin is sprayed on a first mould section provided with a circumferential cutting edge and wherein the skin and the cutting edge are pressed against a rigid substrate positioned onto a second mould section before the skin is cured. In contrast to the laminate to which the invention relates, the flexible skin of the laminate obtained in the method disclosed in WO 03/078128 does not comprise a flexible lip which is pressed against the rigid substrate in such a manner that it is bent against the substrate to avoid foam leakage. Also the rigid substrate does not comprise such a flexible lip so that the foaming reaction mixture can penetrate between the flexible skin and the rigid substrate. As described in WO 03/078128 a film of foaming reaction mixture more particularly penetrates between the skin and the substrate in the circumferential area where both are pressed together to adhere the skin to the substrate. The cutting edge is also pressed against the substrate so that the overspray of skin material can easily be removed. The method disclosed in WO 03/078128 has however still the drawback that the cutting edge has the fit accurately against the substrate since otherwise foam leakage will occur.

To avoid foam leakage, it is known to provide compressible or inflatable seals between the skin and the lower mould halve or between the substrate and the upper mould halve. Such seals complicate however the design of the backfoam moulds and render those moulds more expensive.

Another solution for avoiding foam leakage is disclosed for example in JP 2000-246742 and consists in adhering a sealing strip onto the substrate along the edges thereof. Due to the three-dimensional shape of the substrate it is a quite complex and time-consuming process to adhere the sealing strip accurately onto the substrate.

Other prior art documents, in particular in JP 2003-220854, JP 2003-001740, JP 2002-210757, JP 2003-251639, JP 2003-117928 and U.S. Pat. No. 5,976,289, disclose to use the rearward flange of the skin to avoid foam leakage. In the backfoam mould this flange is laterally supported by a portion of the rigid substrate in order to withstand the foam pressure. A drawback of such a method is therefore that the rigid support has to extend along the lateral side of the laminate which considerably reduces the design possibilities. More particularly, the rigid support extends in this way substantially up to the visible front side of the laminate. This known method can thus only be used for hidden edges of the trim part or when the rigid substrate forms an aesthetic visible surface adjacent the visible surface formed by the skin.

In JP 05-329849 still a further solution is disclosed for avoiding foam leakage. The sealing of the skin against the substrate is accomplished by a hollow sealing protrusion integrally produced in the skin. This sealing protrusion, which is formed by a border part of the skin, has a rounded top which is engaged against the rigid substrate during closure of the backfoaming mould halves, hereby avoiding backfoam leakage. The present inventors have however found that such a hollow seal has the important drawback that during compression of the seal against the substrate, the skin portion extending along the sealing protrusion to the main skin part is displaced over the mould surface, resulting to skin deformations and thus to reduced visual quality of the laminate. A further drawback of the method disclosed in JP 05-329849 is that a portion of the skin and of the rigid substrate extend beyond the seal and have to be removed for further processing.

An object of the present invention is to provide a new panel-like laminate produced starting from a skin having a flange and a border part which comprises a sealing lip and which enables to form an effective seal against the rigid substrate when moulding the intermediate layer between the skin and the substrate without causing a deformation of the adjacent skin portion.

To achieve this object, the panel-like laminate according to the invention is characterised in that on the front side of the skin the border part further comprises at least one continuous or discontinuous ridge extending along the flange of the skin.

The continuous or discontinuous ridge enables to immobilise the portion of the skin which extends along the flexible lip on the mould surface when moulding the intermediate layer between the skin and the substrate. The ridge enables more particularly to prevent the inner side of the border part of the skin from being displaced over the mould surface towards the main part of the skin when the mould is closed and the rigid substrate is pressed onto the flexible lip. The portion of the skin situated along the border part is thus no longer deformed by the bending of the flexible lip upon closure of the mould.

In a preferred embodiment of the laminate according to the invention, the ridge is situated substantially opposite the flexible lip on the border part of the skin.

It was found that in this embodiment, the ridge also helps to keep the flexible lip in the backfoam mould more firmly into an upright position with respect to the mould surface, i.e. the ridge also helps to prevent the flexible lip from rotating around its base, so that a greater pressure is achieved between the lip and the rigid substrate hereby providing a better sealing.

In a further preferred embodiment of the laminate according to the invention, the flexible lip has a moulded free edge.

The expression "moulded free edge" is meant to indicate that, at least at the location where that flexible lip is provided, the skin is a so-called net shape skin which is moulded directly into the desired shape and does not require cutting, milling, tearing or removing in any other way superfluous moulded parts of the skin. Surprisingly it was found that such a lip can resist the foam pressure in the backfoam mould and can thus effectively act as a seal to avoid foam leakage. This is especially the case when the ridge is situated substantially opposite the flexible lip on the border part of the skin so that the lip is held more firmly in its upward position. An important advantage of this embodiment is that the laminate can be produced directly into its final shape in the backfoam mould without requiring any cutting, punching or milling steps at the locations where such a flexible lip were provided. The flexible lip can not only be provided along the outer periphery of the laminate but also around openings in its front side, in particular around openings which are provided to mount inserts in the laminate.

In another preferred embodiment of the laminate according to the invention, the ridge on the front side of the border part is a continuous ridge.

Although also a discontinuous ridge may increase the tear resistance of the skin, the presence of such a continuous ridge prevents the skin from being damaged by tearing, especially when the skin is a polyurethane skin. When the skin is not a net shape skin, it enables in particular to tear off any superfluous skin material from the edges of the produced laminate, especially when the skin is a polyurethane skin.

The present invention also relates to a flexible skin suited for manufacturing a panel-like laminate according to the invention, to a method for manufacturing such a flexible skin and to a method for manufacturing a panel-like laminate according to the invention.

Other particularities and advantages of the invention will become apparent from the following description of some particular embodiments of the laminate, the skin and the methods for manufacturing them according to the invention. The reference numerals used in this description relate to the annexed drawings wherein.

Figure 2:
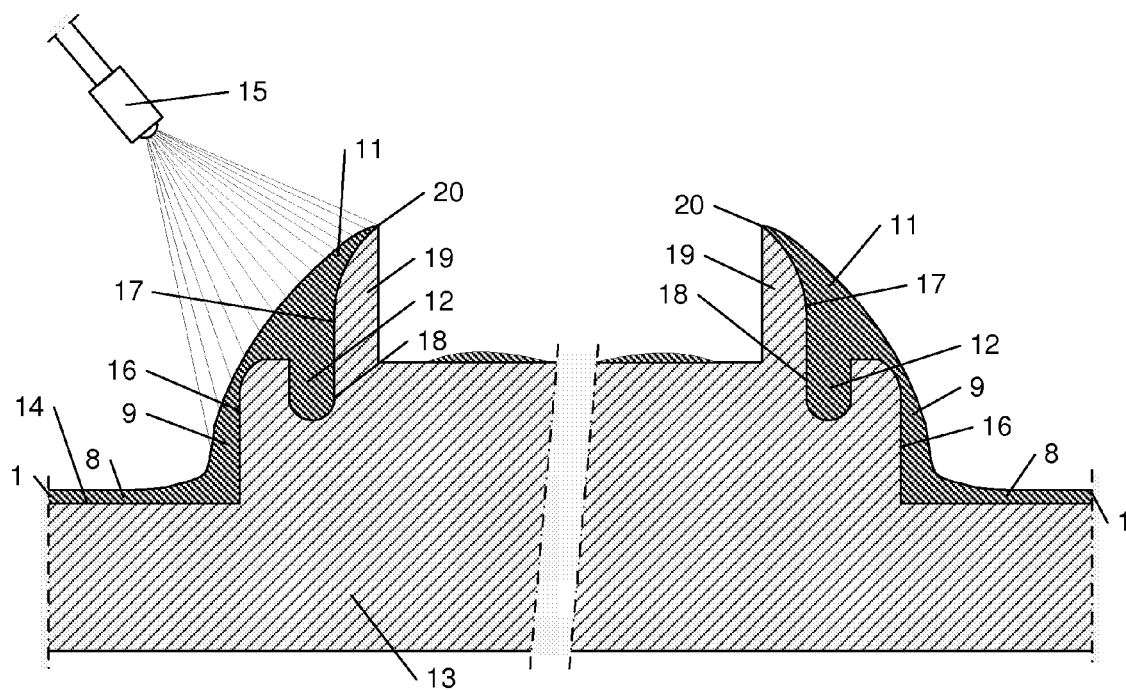
FIG. 2 illustrates a first step in the manufacture of the laminate of FIG. 1, more particularly the step of moulding the flexible skin by a spray process against a mould surface in such a manner that a so-called net shaped skin is obtained.
Figure 3:
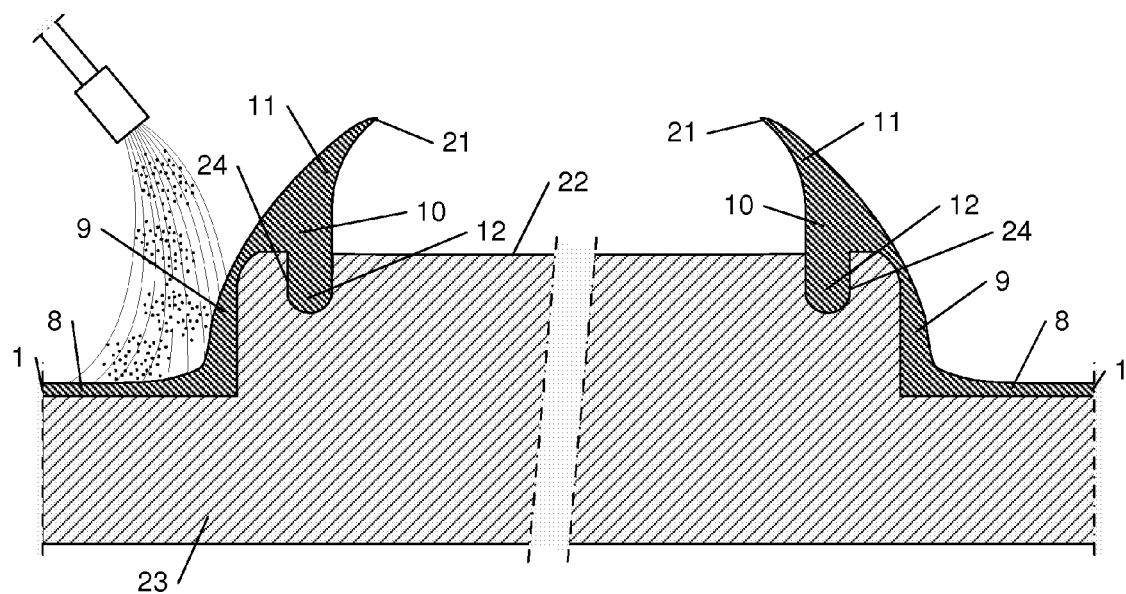
FIG. 3 illustrates a second step in the manufacture of the laminate of FIG. 1, more particularly the step of positioning the moulded skin onto the surface of a first mould section of a backfoam mould and the step of pouring a foamable composition onto the back of the skin.
Figure 4:
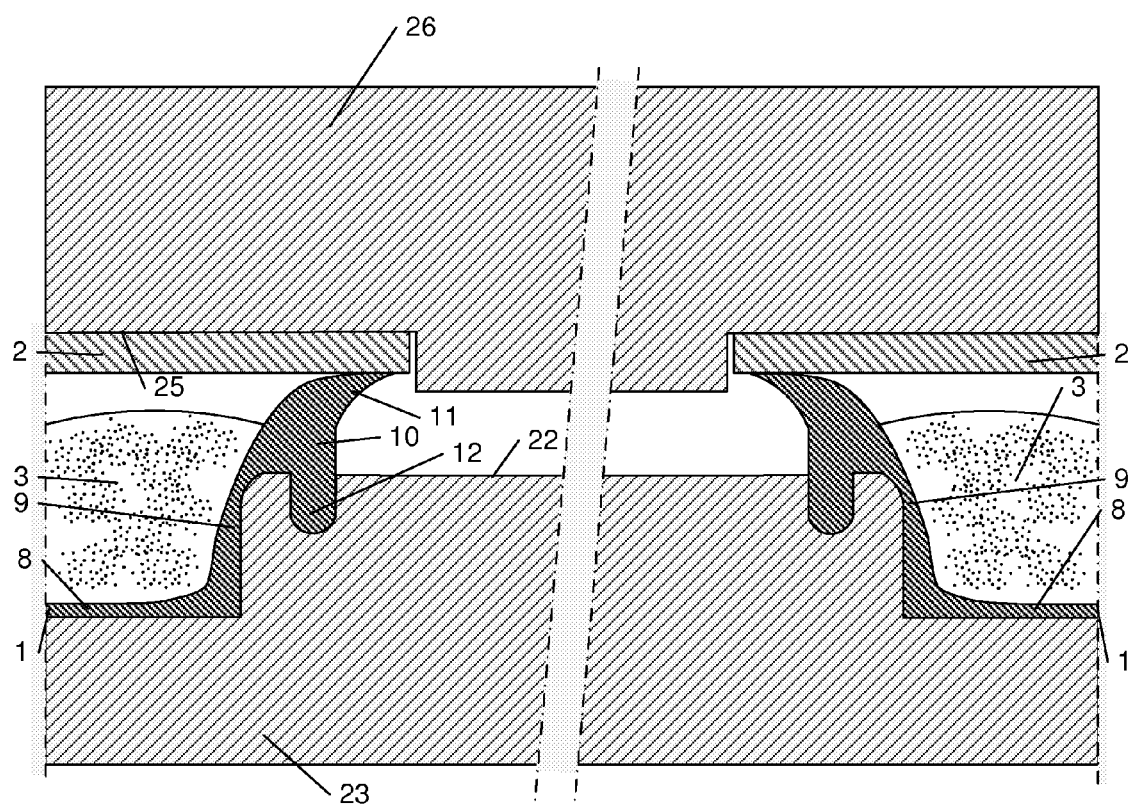
FIG. 4 illustrates a third step in the manufacture of the laminate of FIG. 1, including more particularly the step of closing the backfoam mould by means of a second mould section having the rigid substrate positioned onto its surface and the step of allowing the foamable composition to foam to produce the intermediate layer.
Figure 5:
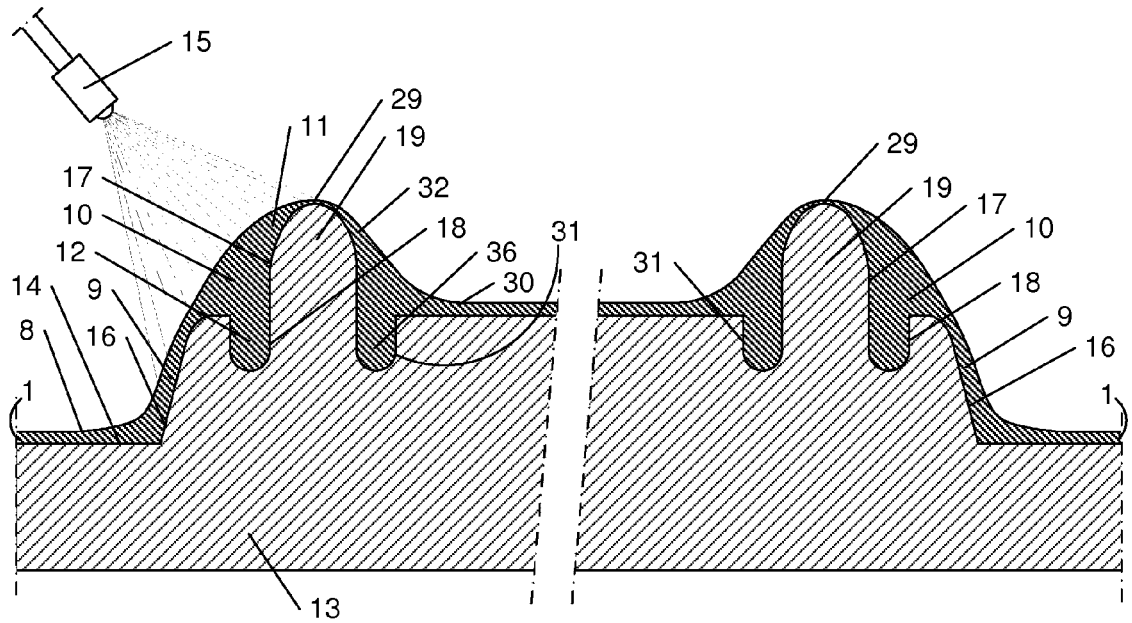
Figure 6:
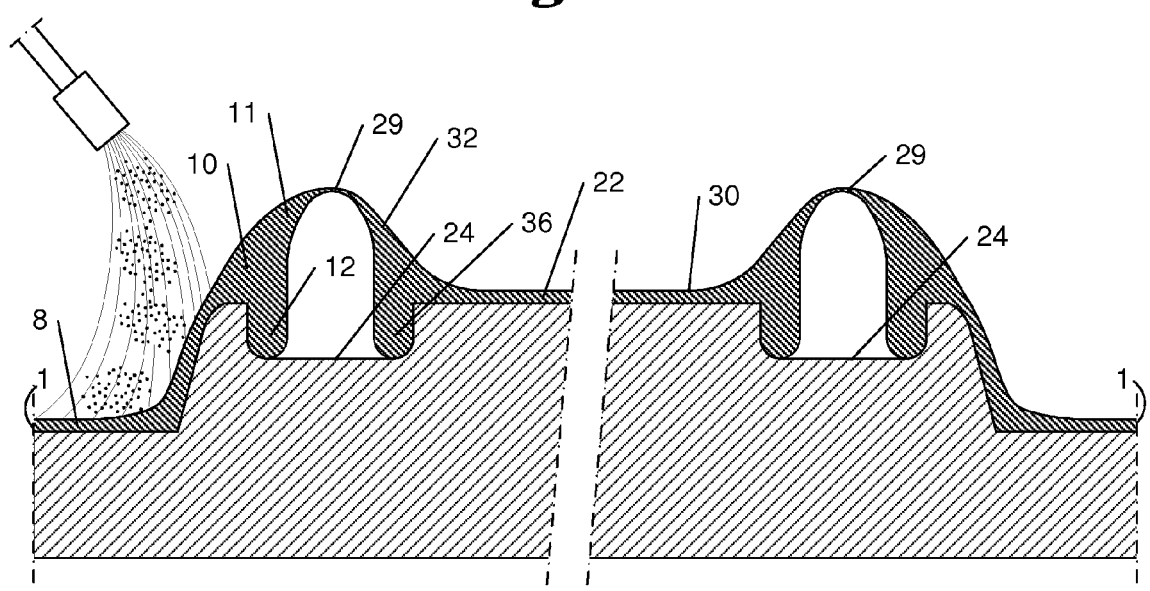
Figure 7:
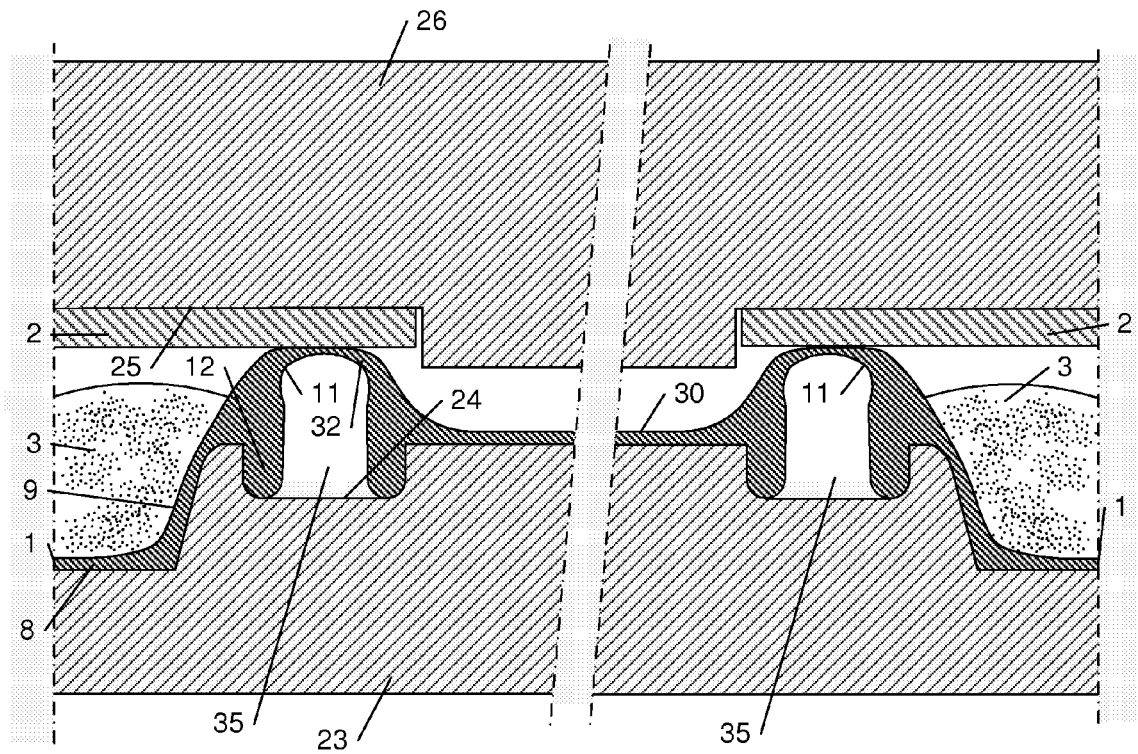
Figure 8:
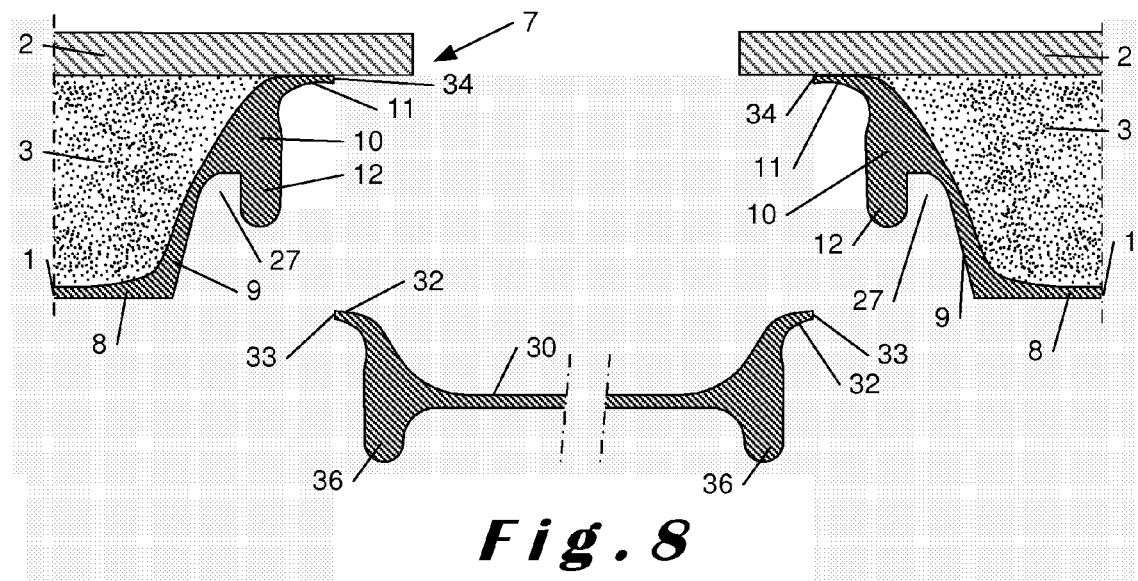

FIGS. 5 to 7 are analogous to FIGS. 2 to 4 but relate to an alternative process for manufacturing a panel-like laminate according to the invention wherein another type of mould is used for moulding to skin so that the skin is not a net shaped skin; and FIG. 8 illustrates the additional step of the alternative manufacturing process wherein the superfluous tear off portion of the skin is torn of from the laminate.

Figure 1:
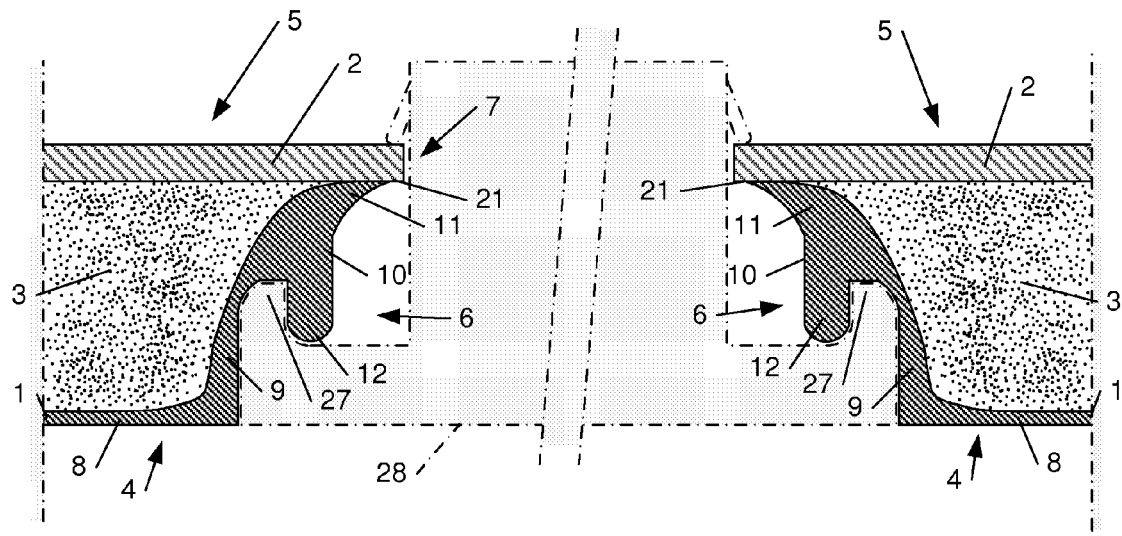
FIG. 1 shows a schematic sectional view of a portion of a panel-like laminate according to the invention including an opening for mounting an insert in the laminate.

The panel-like laminates according to the invention, more particularly the laminates illustrated in FIGS. 1 and 8, comprise a flexible skin 1, a rigid substrate 2 and an intermediate layer 3 adhering the back side of the skin 1 to the front side of the substrate 2. The panel-like laminate is usually a trim part, in particular an interior trim part for automotive vehicles such as a dashboard or instrument panel, a door panel, a console or a glove compartment cover. It has a front side 4, a back side 5 and at least one lateral side 6. The lateral side 6 may either form the peripheral edge of the laminate or an inner edge, around an opening 7 in the laminate, as illustrated in FIGS. 1 and 8.

The flexible skin 1 has an average flexural modulus smaller than 100 MPa, preferably smaller than 75 MPa, more preferably smaller than 55 MPa and most preferably smaller than 40 MPa whereas the rigid substrate 2 is less flexible and has preferably an average flexural modulus higher than 100 MPa, more preferably higher than 200 MPa and most preferably higher than 300 MPa. The flexural moduli indicated in the present specification are measured in accordance with ASTM D790-03. In case the composition of the skin or the substrate does not change from place to place, the average flexural modulus is the same as the flexural modulus measured in accordance with ASTM D790-03. However, when the composition of the skin or the substrate varies from place to place (form example when it consists of two or more layers of different materials which do not have a uniform thickness or when it has not a same density over its entire area) the average flexural modulus is an average of the flexural moduli of the different zones of the skin or substrate. When determining this average flexural modulus, the surface area of the areas having one flexural modulus has to be taken into account, i.e. the average is a surface area weighted average.

The flexible skin 1 comprises a main part 8 which forms the front side 4 of the laminate and at least one flange 9 which extends from the main part 8 of the skin 1 towards the substrate 2 to form at least a portion of the lateral side 6 of the laminate. The flange 9 is extended by a border part 10 of the skin which comprises a flexible lip 11 and a continuous or discontinuous ridge 12. The flexible lip 11 has a top which is pressed against the rigid substrate 2 so that the flexible lip 11 is bent. In the present specification the front side of the skin is considered to extend to the top of the lip which is pressed against the substrate. Since the flange 9 extends towards the substrate 2, the lip 11 has to bridge a smaller gap between the skin 1 and the substrate 2 and can thus more easily withstand any pressure exerted onto the lip 11 when moulding the intermediate layer 3 between the skin 1 and the substrate 2. In other words, the height of the flange 9 can be chosen freely in function of the desired thickness of the intermediate layer 3.

The ridge 12 is provided on this front side of the skin, more particularly on the front side of the border part 10, and extends along the flange 9. The ridge 12 is directed in such a direction that, when the skin 1 is positioned with its front side onto a mould surface which contains a recess for receiving the ridge and which allows a bending of the lip towards the mould surface, the pressure exerted by the substrate 2 onto the flexible lip 1 does not cause a deformation of the skin portion extending on the other side of the ridge 12, opposite the flexible lip 11. In other words, the ridge 12 is directed in such a direction that, when this ridge is received in a corresponding recess in the mould surface, the border part 10 of the skin 1 is prevented by the ridge 12 from sliding on the mould surface towards the flange 9 of the skin 1 when the flexible lip 11 is bent by the pressure exerted thereon by the substrate 2.

The ridge 12 may be a discontinuous ridge since such a ridge can prevent a deformation of the skin, or in other words a sliding of the border part of the skin on the mould surface, when closing the backfoam mould. Preference is however given to a continuous ridge 12, in particular since such a continuous ridge 12 helps to avoid the formation of unwanted tears in the skin edge for example during demoulding of the skin.

A preferred method for manufacturing the panel-like laminate shown in FIG. 1 is illustrated in FIGS. 2 to 4.

In a first step, illustrated in FIG. 2, the flexible skin 1 is made in a mould 13, more particularly onto the surface 14 of this mould which has a shape corresponding to a negative of the front side of the skin 1. To produce the skin 1 a flowable skin material is sprayed by means of a spray nozzle 15 onto the mould surface 14, the flowable skin material is allowed to harden and the produced skin is removed from the mould surface.

The mould surface 14 comprises a first upstanding flank 16 for producing the flange 9 of the skin 1 and a second upstanding flank 17 for producing the flexible lip 11. This second upstanding flank 17 has preferably a convex top surface. Between both upstanding flanks 16 and 17 the mould surface 14 is provided with a continuous or discontinuous groove 18. This groove 18 is filled with the flowable skin material to produce the continuous or discontinuous ridge 12 on the front side of the border part 10 of the skin 1.

The groove 12 is preferably situated substantially at the base of the second upstanding flank 17 so that the groove 12 can be filled more easily with the flowable skin material since a portion of the flowable skin material applied onto the second upstanding flank 17 will flow into the groove 12. Another advantage of such a location of the groove 18 with respect to the second upstanding flank 18 is that the produced ridge 12 will be situated substantially opposite the flexible lip 11 on the border part 10 of the skin 1 and can thus contribute in preventing a rotation of the flexible lip 11 around its base in the next manufacturing step. In this way, a larger pressure and thus a better sealing can be achieved between the flexible lip 11 and the rigid substrate 2.

When spraying the flowable skin material onto the second upstanding flank 17, the layer of skin material applied onto this flank 17 has a thickness which decreases towards the top of the flank 17 so that the flexible lip 11 produced on this flank 17 has a thickness decreasing towards to top of the lip 11. The top of the lip 11 is thus more flexible which enables to achieve also a better sealing against the rigid substrate 2. Moreover it has been found that, independent on the thickness of the skin, the lip 11 has a substantially constant thickness so that a controlled sealing effect is achieved.

In the embodiment illustrated in FIG. 2 the second upstanding flank 17 is formed by an upstanding ridge 19 provided on the mould surface 14. This upstanding ridge 19 has a top comprising a cutting edge 20 which has no curvature radius or a curvature radius smaller than 2 mm, preferably smaller than 1 mm. In this way, in particular when spraying the flowable skin material, the layer of skin material applied onto the second upstanding flank 17 stops on top of the upstanding ridge 19. The flexible lip 11 produced on this upstanding ridge 19 has consequently a moulded free edge 21 which forms at least a portion of the edge of the skin. Any conventional cutting, punching or milling step is no longer required to remove any superfluous material parts from the edge of the skin and the produced skin is in other words a so-called net shaped skin.

In a next step, illustrated in FIG. 3, the skin 1 is positioned onto the surface 22 of the first section 23 of a further mould, more particularly a backfoam mould. The mould surface 22 has a recess 24 for receiving the ridge 12 on the border part 10 of the skin 1 and enables, in the next step, a bending of the flexible lip 11 towards the mould surface 22. In the embodiment illustrated in FIG. 3 this is achieved due to the fact that the front side of the flexible lip 11 is not supported by the mould surface 22. However, in an alternative embodiment, the mould surface 22 could be provided with a resilient element, in particular a foam element, supporting the front of the flexible lip 11 whilst still enabling a bending of the lip towards the mould surface 22.

In the step illustrated in FIG. 4, the rigid substrate 2 is positioned onto the surface 25 of a second section 26 of the further mould and this mould is closed so that a cavity remains between the skin 1 and the substrate 2. This cavity is filled with a curable composition, in particular a foamable composition, which is allowed to cure to produce the intermediate layer 3 between the skin and the substrate. The curable composition can be poured or applied in any other way, as illustrated in FIG. 3, in the open state of the further mould onto the back of the skin or it can be injected, in the closed state of the mould, in the closed cavity between the skin and the substrate.

As can clearly be seen in FIG. 4, the flexible lip 11 of the skin 1 is laterally bent by the pressure exerted thereon by the rigid substrate 2 when closing the mould so that an effective seal is achieved. The flexible lip is more particularly pressed away from the main part 8 of the skin 1. The border part 10 is further prevented by the ridge 12 received in the recess or groove 24 in the mould surface 22 from sliding towards the flange 9 of the skin 1 so that a deformation of the edge portion of the skin is prevented. The ridge 12 not only prevents a sliding of the border part 10 over the mould surface but prevents also a bending of the portion of the border part situated between the ridge 12 and the flange 9, so that the lip is prevented from rotating and so that a larger pressure is thus produced between the flexible lip and the substrate. Due to the formation of an effective seal between the skin and the substrate, a net substrate can be used, i.e. a substrate which requires no further cutting or milling to achieve its final shape.

With respect to the formation of an effective seal between the lip and the substrate, it should be noted that when moulding the intermediate layer, ventilation openings are preferably provided to enable the gas, which is formed during the foaming reaction of the intermediate foam layer, to escape. In the method according to the invention such ventilation openings can easily be provided by cutting recesses in the lip or by directly moulding a lip having locally at least a smaller height.

In the produced laminate, a groove 27 is formed between the ridge 12 on the front side of the skin 1 and the flange 9 thereof. As illustrated in FIG. 1 the groove 27 and the ridge 12 provided around the openings in the laminate can be used to position and fix inserts 28 like ornamental or functional frames or covers in the panel-like laminate.

Another example of a method for manufacturing a panel-like laminate in accordance with the present invention is illustrated in FIGS. 5 to 7 and results in the laminate illustrated in FIG. 8.

In the first step, illustrated in FIG. 5, the flexible skin 1 is also produced by a spray process against the surface 14 of a spray mould 13. A first difference with the embodiment illustrated in FIG. 2 is that the flange 9 of the skin is no longer perpendicular to the adjacent edge of the main part 8 of the skin 1 but forms an angle larger than 90° with this main part 8 so that the lip 11 extends substantially in the same direction as the flange 9. Moreover, the upstanding ridge 19 on the mould surface 14 has no cutting edge but instead a rounded top and the flowable skin material is applied in a layer which extends entirely over the upstanding ridge 19. Along the other side of the upstanding ridge 19, opposite the groove 18, the mould surface 14 is provided with a further continuous or discontinuous groove 31 which is also filled with the flowable skin material. Due to run off of the flowable material from the top of the upstanding ridge 19, the skin 1 has a reduced thickness on the top of the ridge 19 forming a weakened zone 29. As explained hereinafter, this weakened zone 29 will enable to tear off the superfluous part of skin material from the skin.

The skin 1 produced by the method illustrated in FIG. 5 comprises thus, in addition to the main part 8, the flange 9 and the border part 10, a tear off portion 30. This tear off portion 30 comprises a further flexible lip 32 produced on the other flank of the upstanding ridge 19 and having a top edge 33 (illustrated in FIG. 8) which is contiguous to the top edge 34 of the flexible lip 11. The flexible lips 32 and 33 form together a groove 35 in the front side of the skin 1. The bottom of this groove 35 corresponds to the weakened zone 29 which has a reduced thickness and which enables to tear the tear off part from the flexible lip 11. Due to the presence of the further groove 31 in the mould surface 14, the tear off portion of the skin 1 comprises a further continuous or discontinuous ridge 36. This ridge 36, which is preferably a continuous ridge, helps in tearing off the tear off portion 30 in the correct location, i.e. in the weakened zone between both ridges 12 and 36.

The next step, illustrated in FIG. 6, corresponds to the step illustrated in FIG. 3. In this step, the skin 1 is also positioned onto the surface 22 of the first mould section 23 of a further mould, more particularly of the backfoam mould. Instead of being provided with a separate recess 24 for each of the ridges 12 and 36, the mould surface 22 is provided with only one wider recess 24 receiving both ridges 12 and 36. When closing the mould as illustrated in FIG. 7 the lips 11 and 32 function as a compressible seal and are both laterally bent under the pressure exerted thereon by the rigid substrate 2. The ridges 12 and 36 on the front side of the skin 1 prevent the bases of the lips 11 and 32 from being pushed apart and thus prevent a sliding of the border part 10 over the mould surface 22.

The laminate produced in this way also does not require any cutting, punching or milling step to remove the excess of skin material along the edges of the skin. As illustrated in FIG. 8, the tear off portions 30 can indeed simply be torn off from the produced laminate.

The embodiment illustrated in FIGS. 1 to 5 is however more advantageous since a net shape skin is immediately produced so that it is even not required to tear off any tear off portion and so that no material is lost for such tear off portions. Moreover, the flexible lip has a moulded free edge 21 which is more regular than the tear edge 34 so that the edge of the laminate is more nicely finished.

The materials used for manufacturing the laminates according to the present invention can be of different natures.

The rigid substrate will usually be made from a thermoplastic material such as polypropylene (PP), acrylnitrilbutadienestyrol (ABS), polycarbonate (PC), ABS blends, etc. whilst the material of the intermediate layer will usually be a foam material, in particular a polyurethane foam.

The flowable skin material is preferably a curable composition, more particularly a curable polyurethane composition. Such compositions can be applied by a spray or a reaction injection moulding (RIM) process. Suitable spray formulations are disclosed for example in EP-B-0 379 246 whilst suitable RIM formulations are disclosed for example in EP-B-0 929 586. The skin can also be made of two or more separate layers, for example by applying first an in-mold coating or paint and subsequently the elastomeric layer or by applying first a light stable, aliphatic, elastomeric polyurethane layer and subsequently an aromatic polyurethane layer.

The flowable skin material may also be a thermoplastic material such as polyvinylchloride (PVC). The skin can then be made with the conventional techniques such as in particular by a liquid or powder slush moulding process. A thermoplastic material can also be sprayed onto the mould surface.

The invention claimed is:

1. A laminate which has a front side (4), a back side (5) and at least one lateral side (6) and which comprises a rigid substrate (2) forming the back side (5) of the laminate, a flexible skin (1) having a front and a back side, and an intermediate layer (3) adhering the back side of the skin (1) to the substrate (2), the flexible skin (1) comprising a main part (8) forming the front side (4) of the laminate and at least one flange (9) extending from said main part (8) towards the substrate (2) to form at least a portion of the lateral side (6) of the laminate, the flange (9) being extended by a border part (10) of the skin (1) which comprises a flexible lip (11) having a free edge (21, 34), a thickness decreasing towards said free edge and a top which is pressed against the rigid substrate (2) so that the flexible lip (11) is bent, the border part (10) further comprising on the front side of the skin (1) at least one ridge (12) extending along the flange (9) of the skin (1).

2. A laminate according to claim 1, characterised in that said flexible skin (1) has an average flexural modulus, measured in accordance with ASTM D790-03, which is smaller than 100 MPa.

3. A laminate according to claim 1, characterised in that said ridge (12) is a continuous ridge.

4. A laminate according to claim 1, characterised in that said ridge (12) is situated substantially opposite said flexible lip (11) on the border part (10) of the skin (1).

5. A laminate according to claim 1, characterised in that the flexible lip (11) has a moulded free edge (21).

6. A laminate according to claim 1, characterised in that the flexible lip (11) is bent laterally by the pressure exerted by the rigid substrate (2) onto the lip (11).

7. A laminate according to claim 1, characterised in that the flexible lip (11) has a free edge (21, 34) forming at least a portion of an edge of the skin (1).

8. A flexible skin suited for manufacturing a laminate according to claim 1 and having a front and a back side, which flexible skin (1) comprises a main part (8) arranged to form the front side (4) of the laminate and at least one flange (9) arranged to extend from the main part (8) of the skin (1) towards the substrate (2) to form at least a portion of the lateral side (6) of the laminate, the flange (9) being extended by a border part (10) of the skin (1) which comprises a flexible lip (11) having a free edge, a thickness decreasing towards said free edge and a top arranged to be pressed against the rigid substrate (2) so that the flexible lip (11) is bent and forms a seal against said rigid substrate (2), the border part (10) further comprising on the front side of the skin (1) at least one ridge (12) extending along the flange (9) of the skin (1).

9. A skin according to claim 8, characterised in that it has an average flexural modulus, measured in accordance with ASTM D790-03, which is smaller than 100 MPa.

10. A skin according to claim 8, characterised in that said free edge is a moulded free edge (21).

11. A flexible skin suited for manufacturing a laminate according to claim 1 and having a front and a back side, which flexible skin (1) part 8 arranged to form the front side (4) of the laminate and at least one flange (9) arranged to extend from the main part (8) of the skin (1) towards the substrate (2) to form at least a portion of the lateral side (6) of the laminate, the flange (9) being extended b a border art 10 of the skin 1 which comprises a flexible lip 11 having a top arranged to be pressed against the rigid substrate (2) so that the flexible lip (11) is bent and forms a seal against said rigid substrate (2), the border part (10) further comprising on the front side of the skin (1) at least one ridge (12) extending along the flange (9) of the skin (1) and the skin (1) further comprising a tear off portion (30) united to a top edge (34) of the flexible lip (11) and arranged to be torn off therefrom, the tear off portion (30) comprising a further flexible lip (32) having a further top edge (33) contiguous to the top edge (34) of the flexible lip (11) and forming together with the flexible lip (11) a groove (35) in the front side of the skin (1), which groove (35) has a bottom (29) with a reduced thickness enabling to tear off the tear off portion (30) from said flexible lip (11).

12. A skin according to claim 11, characterised in that the tear off portion (30) of the skin (1) comprises at least one further ridge (36) on the front side of the skin (1), which further ridge (36) extends along said groove (35).

13. A method for manufacturing a flexible skin according to claim 8 which has a front and a back side and which comprises a main part (8) arranged to form the front side (4) of said laminate, and at least one flange (9) arranged to extend from the main part (8) of the skin (1) towards the rigid substrate (2) of the laminate to form at least a portion of the lateral side (6) of said laminate, the flange (9) being extended by a border part (10) of the skin (1) which comprises a flexible lip (11) having a free edge, a thickness decreasing towards said free edge and a top arranged to be pressed against the rigid substrate (2) so that the flexible lip (11) is bent and forms a seal against this rigid substrate (2), which method comprises the steps of:
providing a mould (13) defining at least one mould surface (14) having a shape which corresponds to a negative of the front side of the skin (1);
applying at least one flowable skin material for producing the flexible skin (1) against the mould surface (14);
allowing the flowable skin material to harden to produce the skin (1) with its front side against the mould surface (14), the flange (9) of the skin (1) being produced against a first upstanding flank (16) of the mould surface (14) and the flexible lip (11) against a second upstanding flank (17) of the mould surface (14), the flowable skin material being applied on said second flank (17) in a layer having a thickness which decreases towards the top of the second flank (17); and
removing the produced skin (1) from the mould surface (14),
wherein
the mould surface (14) is provided between the first (16) and the second upstanding flanks (17) with a groove (18) which extends along said second upstanding flank (17) and which is filled with the flowable skin material so that said border part (10) of the skin (1) comprises a ridge (12) on the front side of the skin (1).

14. A method according to claim 13, characterised in that the second upstanding flank (17) has a convex top surface.

15. A method according to claim 13, characterised in that the flowable skin material is sprayed onto the mould surface (14).

16. A method according to claim 13, characterised in that the flowable skin material is a thermoplastic material.

17. A method according to claim 13, characterised in that the flowable skin material is a curable composition.

18. A method according to claim 13, characterised in that said second flank (17) is formed by an upstanding ridge (19) provided on the mould surface (14).

19. A method according to claim 18, characterised in that the upstanding ridge (19) has a top comprising a cutting edge (20) which has no curvature radius or a curvature radius smaller than 2 mm.

20. A method according to claim 13, characterised in that the flowable material is applied in a layer on the mould surface (14) which stops on top of said second upstanding flank (17).

21. A method for manufacturing a flexible skin according to claim 11 which has a front and a back side and which comprises a main part (8) arranged to form the front side (4) of said laminate, and at least one flange (9) arranged to extend from the main part (8) of the skin (1) towards the rigid substrate (2) of the laminate to form at least a portion of the lateral side (6) of said laminate, the flange (9) being extended by a border part (10) of the skin (1) which comprises a flexible lip (11) having a top arranged to be pressed against the rigid substrate (2) so that the flexible lip (11) is bent and forms a seal against this rigid substrate (2), which method comprises the steps of:
providing a mould (13) defining at least one mould surface (14) having a shape which corresponds to a negative of the front side of the skin (1);
applying at least one flowable skin material for producing the flexible skin (1) against the mould surface (14);
allowing the flowable skin material to harden to produce the skink)) with its front side against the mould surface (14), the flange(9) of the skin (1) being produced against a first upstanding flank (16) of the mould surface (14) and the flexible lip (11) against a second upstanding flank (17) of the mould surface (14), the second upstanding flank (17) being formed by an upstanding ridge (19) provided on the mould surface (14); and
removing the produced skin (11 from the mould surface (14),
wherein
the mould surface (14) is provided between the first (16) and the second upstanding flanks (17) with a groove (18) which extends along said second upstanding flank (17) and which is filled with the flowable skin material so that said border part (10) of the skin (1) comprises a ridge (12) on the front side of the skin (1), and wherein the flowable skin material is applied in a layer on the mould surface (14) which extends entirely over the upstanding ridge (19), with a weakened zone (29) having a reduced thickness being formed in the skin (1) on top of the upstanding ridge (19).

22. A method according to claim 21, characterised in that the mould surface (14) is provided along the upstanding ridge (19), opposite said groove (18), with a further groove (31) which is also filled with the flowable skin material.

23. A method for manufacturing a laminate according to claim 1, characterised in that it comprises the steps of:
providing a further mould comprising first and second mould sections (23 and 26) which are movable with respect to one another to open and close the further mould and which have a first (22) and respectively a second mould surface (25);
positioning said flexible skin (1) onto the first mould surface (22) and a rigid substrate (2) onto the second mould surface (25) so that the ridge (12) on the front side of the skin (1) extends in a recess (24) in the first mould surface (22);
closing the second mould so that a cavity remains between the skin (1) and the substrate (2) and so that a pressure is exerted by the rigid substrate (2) onto the flexible lip (11), the flexible lip (11) of the skin (1) being laterally bent by the pressure exerted thereon by the rigid substrate (2) to form a seal closing off said cavity and the border part (10) of the skin (1) is prevented from sliding on the first mould surface (22) towards the flange (9) of the skin upon bending of the flexible skin (11) by having positioned the ridge (12) on the front side of the skin (1) in said recess (24);

applying either before or after having closed the second mould a curable composition between the skin (1) and the substrate (2) and allowing it to cure in said cavity to produce the intermediate layer (3) adhering the skin (1) to the substrate (2); and opening the second mould and removing the produced laminate.

24. A method according to claim 21, characterised in that the flowable skin material is sprayed onto the mould surface (14).

25. A method according to claim 21, characterised in that the flowable skin material is a thermoplastic material.

26. A method according to claim 21, characterised in that the flowable skin material is a curable composition.

27. A laminate according to claim 6, characterised in that the flexible lip (11) is pressed away from the main part (8) of the skin.

28. A skin according to claim 11, characterised in that it has an average flexural modulus, measured in accordance with ASTM D790-03, which is smaller than 100 MPa.

29. A method according to claim 19, characterised in that said cutting edge (20) which has no curvature radius or a curvature radius smaller than 1 mm.

* * * * *